No. 833,476. PATENTED OCT. 16, 1906.
M. R. MURRAY.
HORSESHOE CALK.
APPLICATION FILED MAR. 30, 1906.
Fig. 1.
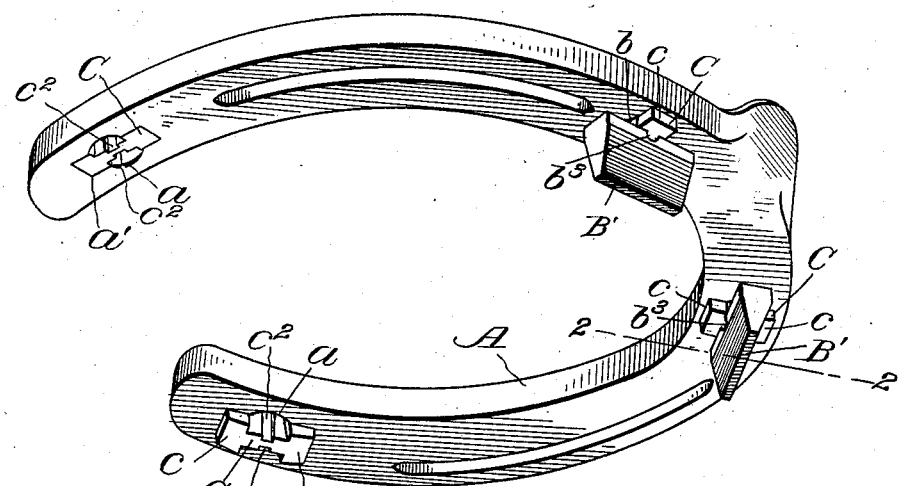
Fig. 2.     Fig. 3.     Fig. 4.
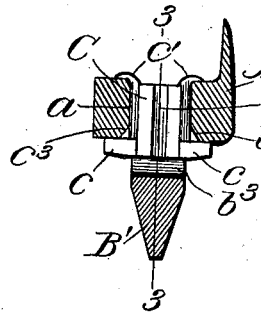 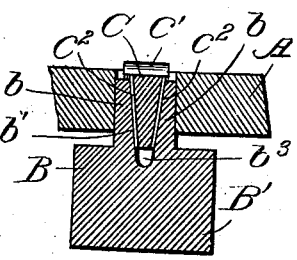 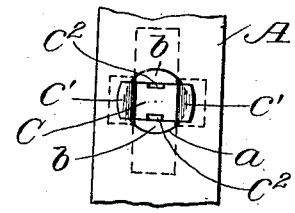
Fig. 7.     Fig. 5.     Fig. 6.
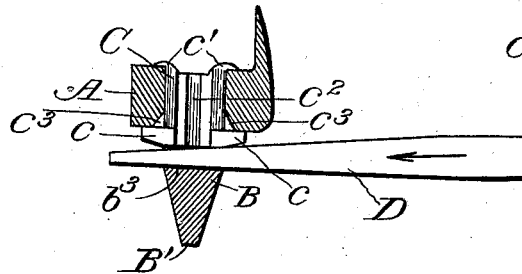 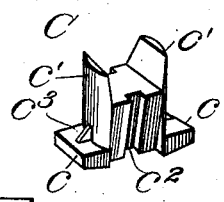 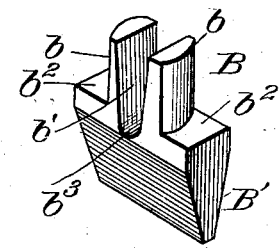
Witnesses
C. H. Walker
James B. Mansfield
Inventor
Michael R. Murray
By Alexander Powell
Attorneys
THE NORRIS PETERS CO., WASHINGTON, D. C.

UNITED STATES PATENT OFFICE.

MICHAEL R. MURRAY, OF CAMBRIDGE, NEW YORK, ASSIGNOR TO THE TROJAN TOE-CALK COMPANY, OF TROY, NEW YORK, A CORPORATION OF NEW YORK.

HORSESHOE-CALK.

No. 833,476.  Specification of Letters Patent.  Patented Oct. 16, 1906.

Application filed March 30, 1906. Serial No. 308,945.

*To all whom it may concern:*

Be it known that I, MICHAEL R. MURRAY, of Cambridge, in the county of Washington and State of New York, have invented certain new and useful Improvements in Horseshoe-Calks; and I hereby declare that the following is a full, clear, and exact description thereof, reference being had to the accompanying drawings, which form part of this specification.

This invention is a novel detachable horseshoe-calk, and is an improvement on the calks for which Letters Patent No. 740,164 were granted to me on the 29th day of September, 1903; and the object of this invention is to improve the construction of the parts, so that the wedge can be securely fastened in place and will not be liable to turn and the calk can be more readily put on or removed from the shoes.

The invention therefore consists in the improved novel construction of the calk, as hereinafter described and claimed, and illustrated in the accompanying drawings, in which—

Figure 1 is a perspective view of a horseshoe fitted with my improved calks. Fig. 2 is an enlarged section on line 2 2, Fig. 1. Fig. 3 is a section on line 3 3, Fig. 2. Fig. 4 is a detail top plan view. Figs. 5 and 6 are detail views of the wedge and calk detached, and Fig. 7 is a sectional view illustrating the mode of removing the calks.

The horseshoe A may be of any suitable construction, such as commonly employed, simply being provided with vertical holes $a$ at points where it is desired to attach calks, these holes being preferably circular in cross-section and may be slightly smaller at bottom than at top.

The calks B may have heads of any suitable or desired form, and shanks $b$, circular in cross-section, approximately the same diameter as holes $a$ and adapted to enter therein. The heads B', as shown, are wedge-shaped in cross-section and are about as long as the shoe is wide, so that they project at each side of the shank, the projecting portions forming bearing-shoulders $b^2$ at each side, adapted to contact with the under side of the shoe if the shank be driven entirely home. The shanks $b$ are longitudinally slotted, as at $b'$, the slots being approximately V-shaped and widest at top and being rounded at bottom, as at $b^3$. The slot $b'$ in the shank is to engage a spreading-wedge C, which is placed in the hole $a$ before the shank is inserted therein. This wedge is provided on its lower side with wings $c$, adapted to engage the under side of the shoe and prevent the wedge rising through the hole. The wedge is the complement of the shank, and when both are in position and the shank driven home the hole is approximately filled, as shown in Fig. 4.

On the upper end of the wedge are formed teats or ears $c'$, which are adapted to be hammered down over the upper edge of the shoe and retain the wedge in position when the calks are withdrawn. The wedge may also be provided with fins $c^3$ on its lower side at the junction of the wings, which fins are adapted to bite into the shoe when the wedge is driven home and prevent the wedge turning in the hole. These fins $c^3$ can be formed during the stamping operation when the wedges are made by dies. The wedges are also provided with recesses or slots $c^2$ in their inclined faces to lessen the friction between the wedge and shank when the latter is driven home.

The wedge C is first placed in a hole $a$, so as to extend diametrically across the same and axially thereof. Then the shank of a calk is inserted into the hole with its slot $b$ engaging the wedge, and as the shank is driven in the wedge spreads the bifurcations of the shank apart and causes them to bind tightly in the hole, and the harder the calk is forced in the more tightly is it secured in place. As the calks are pounded inward at every step of the animal, there is no danger of their accidentally loosening.

The wings $c$ of the wedges C may be seated in slots or recesses $a'$ in the lower side of the shoe to prevent the wedges turning. The wedges are so short that they cannot project above the shoe and injure the hoof. The shoulders $b^2$ on the calk will protect the wings of the wedge and prevent the calk-shank being driven too far upward in any event. The slot $b$ in the calk should not be tapered so much as the wedge, so that the latter will have a proper spreading effect upon the shank.

The slot $b$ is preferably of such depth that the wedge cannot entirely seat therein, and this facilitates the removal of the calks whenever it is desirable to do so, all that is necessary being to insert the point of the wedge-shaped tool D (see Fig. 7) between the base of slot $b$ and the wedge and drive the tool inward until the calk-shank is forced out of the hole or socket, which operation can be readily done without removing the shoe from the hoof. The rounded end $b^3$ of the slot brings the point of the calk-remover to the center of the calk and facilitates the removal of the latter.

Having described my invention, what I claim as new, and desire to secure by Letters Patent, is—

1. In combination, a horseshoe having a calk-engaging hole, a wedge inserted in said hole, having wings on its lower end to prevent its being driven upward through the hole, and provided with ears on its upper end to prevent its removal from the holes; with a calk having a shank provided with a slot, and adapted to enter the hole, engage the wedge, and be spread thereby so as to retain it in the hole, substantially as described.

2. In combination, a horseshoe having a calk-engaging hole, a wedge adapted to be inserted in said hole, and extending longitudinally and transversely thereof, and provided with wings on its lower end to prevent it passing upwardly through the hole, and with channels in its inclined faces; with a calk having a shank adapted to enter the hole, said shank having an elongated V-slot adapted to engage the wedge, whereby when the shank is driven home it is expanded and bound in the hole.

3. In combination, a horseshoe having a calk-engaging hole, a wedge adapted to be inserted in said hole provided with wings on its lower end to prevent it passing upwardly through the hole, and with lugs on its upper side adapted to be turned down upon the upper edge of the shoe to prevent the wedge being withdrawn; with a calk having a shank adapted to enter the hole, said shank having an elongated V-slot adapted to engage the wedge, whereby when the shank is driven home it is expanded and bound in the hole.

4. In combination, a horseshoe having a calk-engaging hole, a wedge inserted in said hole, having wings on its lower end to prevent its being driven upward through the hole, and ears on its upper ends to prevent its dropping from the hole, and fins to prevent its turning in the hole; with a calk having a shank provided with a slot, and adapted to enter the hole, engage the wedge, and be spread thereby so as to retain it in the hole, substantially as described.

5. The herein-described horseshoe-calk comprising a wedge adapted to be inserted in a hole in a horseshoe and having wings on its lower end adapted to engage the under side of the shoe, and lugs on its upper end adapted to be turned down upon the upper side of the shoe to hold the wedge in place, and with channels in its inclined faces; with a calk having a shank provided with an elongated V-slot adapted to engage the wedge when in the hole and also having an elongated head having bearing-shoulders at opposite sides of the wedge-wings, substantially as described.

In testimony that I claim the foregoing as my own I affix my signature in presence of two witnesses.

MICHAEL R. MURRAY.

In presence of—
D. M. WESTFALL,
ALFRED G. HILL.